United States Patent [19]

Grossman

[11] 4,003,363
[45] Jan. 18, 1977

[54] SOLAR PANEL CONSTRUCTION

[76] Inventor: Abraham Grossman, 9339 Rhea Ave., Northridge, Calif. 91325

[22] Filed: June 10, 1974

[21] Appl. No.: 477,811

[52] U.S. Cl. .............................. 126/270; 126/271; 237/1 A
[51] Int. Cl.[2] .......................................... F24J 3/02
[58] Field of Search ........... 126/270, 271; 237/1 A; 52/172

[56] References Cited

UNITED STATES PATENTS

| | | | |
|---|---|---|---|
| 1,889,238 | 11/1932 | Clark | 126/271 |
| 2,311,579 | 2/1943 | Scott | 126/271 |
| 2,316,191 | 4/1943 | Scott | 126/271 |
| 2,705,948 | 4/1955 | Rostock | 126/271 |
| 2,902,028 | 9/1959 | Manly | 126/271 |
| 3,039,453 | 6/1962 | Andrassy | 126/271 |
| 3,775,914 | 12/1973 | Patil | 52/172 |

Primary Examiner—Kenneth W. Sprague
Attorney, Agent, or Firm—Poms, Smith, Lande & Glenny

[57] ABSTRACT

A solar panel construction including an elongated, sealed, flat, polygonal case or receptacle within which is supported a metal solar energy collector panel on rigid permeable insulation material and also relatively soft yieldable permeable insulation material and a radiant energy transmitting means is spaced above the collector panel, the construction being hermetically sealed and dehumidified and particularly arranged to yield under conditions of temperature extremes without loss of hermetic sealing and loss of efficiency. A method of preconditioning such a solar panel construction to obtain optimum effectiveness between temperature ranges to which the panel construction will be subjected.

14 Claims, 14 Drawing Figures

SOLAR PANEL CONSTRUCTION

BACKGROUND OF THE INVENTION

The present energy crisis has inspired activity in the search for and use of additional sources of energy, one of such sources being solar energy. The numerous advantages and benefits in utilizing solar energy for heating and cooling buildings, building facilities such as hot water, and the conservation of other fuels such as oil and gas are the subject of an article in Actual Specifying Engineer of August 1973 Pages 84 – 92 which was adapted from the testimony of Fred S. Dubin before the Subcommittee on Energy, of the House, Science and Astronautics Committee on June 12, 1973.

Prior attempts to utilize solar energy have been made since and prior to the early part of this century (U.S. Pat. No. 980,505). Apparatus for heating water by circulating water through tubes exposed to the sun and carried in a receptacle are disclosed in U.S. Pat. Nos. 2,274,492; 2,311,579; 2,693,939; and 3,039,453. Such prior proposed solar energy devices had various advantages and disadvantages and were probably not commercially successful because of the presence and availability of what was considered to be more effecient and more economic energy sources such as oil, gas and coal. Some of the disadvantages of the prior proposed solar energy devices included constructions in which the collected energy in the form of heat was subject to dissipation and loss at a relatively high rate in the transfer of such heat to other energy forms. In addition, under conditions of maximum exposure to solar energy, the materials used in the energy device were not adapted or arranged to withstand the extremely high temperatures such as 400° to 500° F. and also withstand low temperatues which may extend to 0° F. or below. It is desirable that a solar energy device be capable of operation under the weather and temperature conditions encountered during the entire year, since in the winter solar energy can supplement heating of water and the home, and in the summer the energy developed from a solar energy device may be employed to supply air conditioning as well as hot water requirements. The improvement in types of materials available and their adaptability to extreme weather and temperature conditions may provide a solar energy device capable of effective commercial operation.

SUMMARY OF THE INVENTION

The present invention relates to a solar energy panel construction so arranged and designed that the panel construction may be utilized under extreme ranges of weather and temperature conditions and is particularly efficient in the transfer of solar energy into another form of energy capable of being easily utilized.

An object of the present invention is to provide a solar panel construction including a method of assembly to precondition the panel construction for optimum operating efficiency.

Another object of the invention is to provide a solar panel construction capable of withstanding a maximum or extreme range of temperature conditions without losing its efficiency or effectiveness in collecting solar energy.

A further object of the invention is to provide a solar panel construction which is hermetically sealed and capable of expanding and contracting without loss of such sealing effect under extreme temperature conditions.

A still further object of the present invention is to provide a solar panel construction in which expansion and contraction of the different materials employed in its construction are compensated without breaking the hermetic seal of the panel.

Still another object of the present invention is to povide a solar panel construction adapted to yield to fluctuations in air pressure within the panel.

A general object of the invention is to provide a solar panel construction capable of being manufactured and commercially produced and installed in a relatively inexpensive manner.

More specifically, the present invention contemplates a solar panel construction comprising an elongated rectangular receptacle of sheet material provided with fiberglass insulation covering the bottom wall and the side walls of the receptacle. A solar energy absorber plate provided with fluid circulating tubes and a black coating is supported at its marginal edges upon said insulation material which is relatively rigid in structure while the interior portions of the plate are supported upon insulation material of relatively soft structure. The insulation material both rigid and soft is permeable. Spaced above the solar absorber plate is a dual pane window to transmit radiant energy from the sun and yet reduce heat transfer from the air space and the solar panel beneath the window. The entire panel is hermetically sealed and so constructed, that as the temperature increases within the receptacle and the air pressure becomes greater, the absorber plate and the receptacle can move and compensate for such changes in pressure and temperature. The invention contemplates a method of assembling the solar panel construction so that the compensation stresses imposes upon the receptacle and panel during operation is reduced.

Various other objects and advantages of the present invention will be readily apparent from the following description of the drawings in which exemplary embodiments of the invention are shown.

Figures 1, 2, 3:
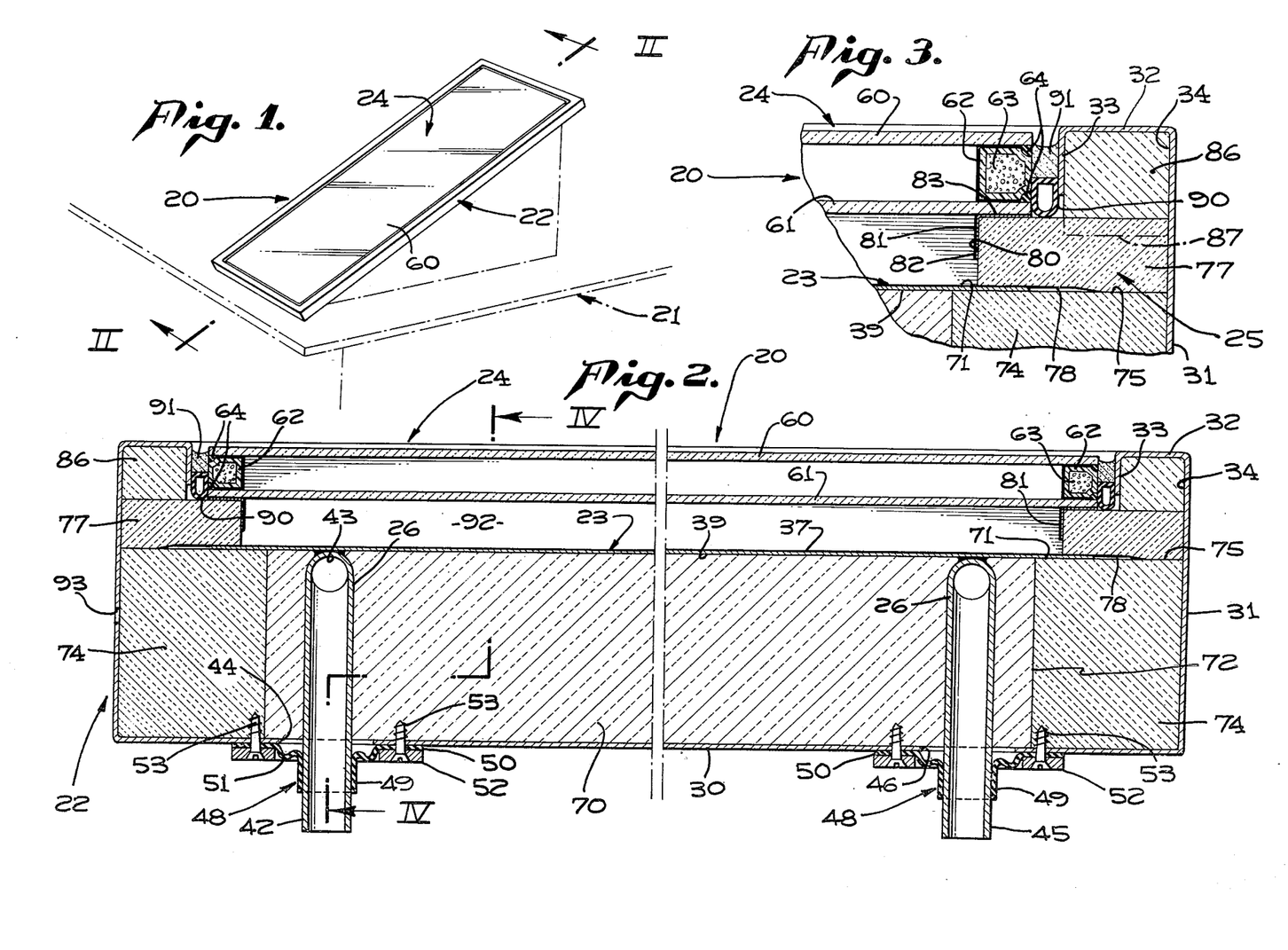
FIG. 1 is a fragmentary perspective view of a solar panel construction embodying this invention in an inclined position to receive solar radiant energy.
FIG. 2 is an enlarged vertical sectional view taken in the plane indicated by line II—II of Fig. 1.
FIG. 3 is an enlarged cross-sectional view of the upper right corner of Fig. 2.
Figure 4:
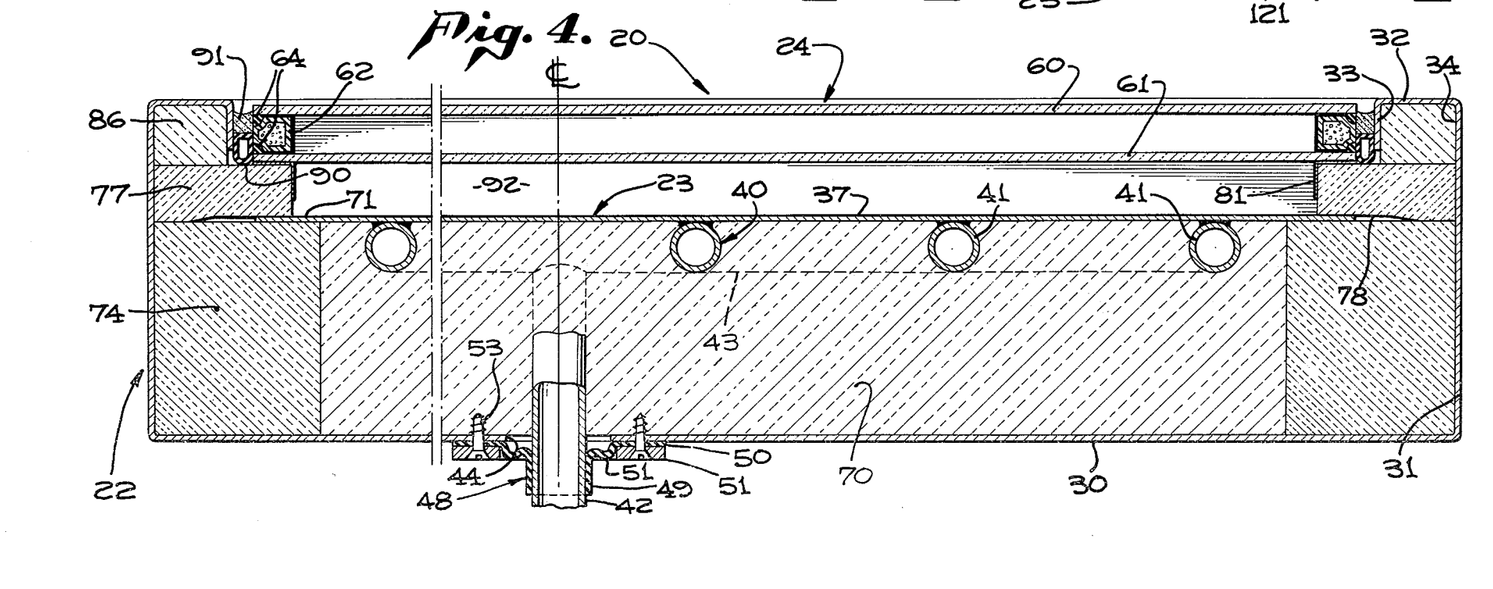
Fig. 4 is a transverse sectional view taken in the planes indicated by line IV—IV of Fig. 2.

A preferred example of the present invention is illustrated in the drawings and, particularly referring to Figs. 1 and 2, in which my novel solar panel construction is generally indicated at 20. Panel construction 20 may be inclined at a selected angle to the horizontal as more fully described later and may be supported from a suitable floor, deck or roof generally indicated at 21. Optimum exposure of the panel construction 20 to the sun taking into consideration the latitude of the panel site is exemplified in Fig. 1.

Generally speaking, solar panel construction 20 includes an elongated rectangular receptacle 22 within which a solar collector plate 23 is supported in spaced relation to a radiant energy transmitting means 24. The solar collector plate and energy transmitting means 24 are supported on permeable insulation mounting means generally indicated at 25 which enhances the operability of the solar panel. Solar collector plate 23 is in conductive contact with a suitable array or pattern of fluid conducting tubes 26. The solar panel construction 20 is hermetically sealed, is arranged to be capable of expansion and contraction of its several component parts of different material, and is adapted to withstand temperatures of materials used therein in the order of about 450° to 550° F. The solar panel construction contemplates the collection of radiant energy from the sun, to effectively operate under such relatively high temperatures, and to transfer such radiant energy into an effective fluid form whereby the transferred energy may be utilized for one or more selected purposes such as providing hot water, heating a building, cooling a building, and the like.

In detail, solar panel construction 20 may comprise the receptacle, box, or case 22 which may be formed from a single rectangular blank sheet of sheet metal material. The sheet metal may be galvanized on both surfaces and may be formed to provide an elongated rectangular bottom wall 30, an upstanding peripheral wall 31 integral with bottom wall 30. Along the top of peripheral wall 31 is an inwardly turned wall margin 32 terminating in a downwardly extending lip 33 forming with said wall margin 32 and the upper portion of peripheral wall 33 a peripheral downwardly facing recess 34. In formation of the rectangular case, wall margins 32 and depending lips 33 are cut along a bias so that each corner is mitered. The corners formed by peripheral wall 31, edge margin 32 and lips 33 are welded or brazed along the length of the corner joint so that the receptacle 22 is fluid tight. An exemplary rectangular dimension of such a receptacle 22 may be 2 feet wide and 7 feet long. The sheet metal material may comprise brake-formed 22 gauge galvanized steel. A butyl-based sealant may be applied at the welded corners to assure air tightness.

Solar collector plate 23 comprises a flat rectangular metal plate of slightly smaller dimension than the rectangular dimension of the case. The collector or absorber plate 23 may be fabricated of aluminum copper, stainless steel, or other suitable metal materials. In the example shown in Figs. 2 – 5, collector plate 23 is mounted within the receptacle 22 below the plane of the opening defined by wall margins 32 and depending lips 33 and is provided with an upwardly facing uninterrupted planar top surface 37 to receive radiant energy from the sun. The top surface 37 is preferably coated with a black coating having characteristics of maximum absorptivity and minimum reflectivity. The characteristic of minimum reflectivity is preferably one which closely approximates a true "black body" for which reflectivity is zero. Radiant energy which is reflected from the surface 37 is not absorbed by the surface 37 and therefore decreases the efficiency of the energy absorption. Such black coatings include coatings of black oxide, black anodizing for aluminum and its alloys, and a black sprayable paint of polyurethane. An example of such a paint is Velvet Black 401 manufactured by the Three M Company. Under temperatures greater than ambient, certain of such black coatings are subject to outgassing which results in the emission of gaseous vapors within the receptacle. Outgassing is undesirable because collection of such gas in the space between the collector plate 23 and the radiant energy transmitting means 24 results in fogging or clouding of such air space and interferes with unobstructed transmission of solar radiant energy to collector plate 23. A solar collector plate having a black coating which has minumum outgassing, minimum reflectivity, and maximum absorptivity is preferred.

Figure 5:
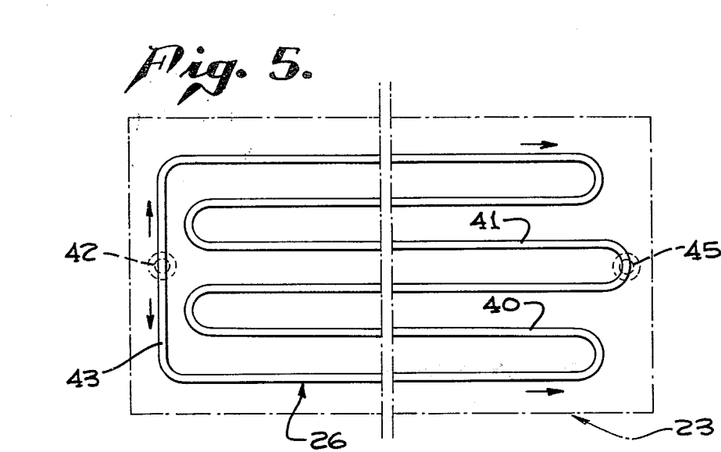
FIG. 5 is a schematic plan view of an exemplary solar collector panel used in this invention.

The bottom surface 39 of collector plate 23 may be uncoated. On the bottom surface 39 may be secured as by welding or brazing, metal conduit or tubing 40 suitably arranged in a winding serpentine path so that tubing sections 41 lie in parallel relation and extend for substantially the entire length of the collector plate. The tubing 40 is connected along its entire length by welding or brazing to the collector plate so that heat absorbed by the plate from the radiant energy falling thereupon is conducted by the plate directly to the tubing. The tubing may be of the same material as the plate. At one end of the plate an inlet tubing portion 42 is provided which joins the serpentine tubing at a transverse header portion 43. Inlet portion 42 extends through an opening 44 in bottom wall 30. An outlet end portion 45 of tubing 40 may be provided at the opposite end of collector plate 23 from inlet portion 42 and at a bent U portion of the centrally located portions of tubing 40. Outlet tubing portion 45 also extends through an opening 46 in the bottom wall 30. The serpentine arranged tubing 40 thus provides two continuous flow paths for fluid from inlet tubing portion 42 to outlet tubing portion 45, one path being directed along the tubing portions 41 lying in the upper half of Fig. 5 and the other path lying in the lower portions of said tubing as shown in Fig. 5. In normal installation, the solar panel construction is inclined at an angle to the horizontal and when so inclined the inlet tubing portion 42 may be at the upper part of the inclined panel construction and the outlet portion at the lower panel portion.

Openings 44 and 46 for the inlet and outlet tubing portions 42 and 45 are sealed in such a manner that the tubing portions 42 and 45 may move laterally and axially with respect to bottom wall 30 without impairing the sealed relationship of the inlet and outlet tubing portions with respect to the receptacle. Means for sealing the passage therethrough of the inlet and outlet portions may comprise an elastomeric fitting 48 of flexible impervious heat resistant material having a cylindrical outer sleeve 49 tightly receiving the tubing portion and secured thereon by suitable bounding or adhesive material. Outer sleeve 49 terminates in a laterally extending annular flange 50 which is joined to sleeve 49 by an annular formed corrugation 51. Flange 50 is secured in tight sealing relation to the outer surface of bottom wall 30 by an annular retainer ring 52 secured by suitable sheet metal screws 53 to bottom wall 30. The annular corrugation 51 which joins the sleeve 49 and the flange 50 of the gasket fitting 48 is flexible and yieldable and capable of permitting the tubing portion to move laterally of its axis, longitudinally of its axis, and also yields to any axial misalignment of the tubing with respect to the opening 44 or 46.

Within the top opening of receptacle 22 and in spaced relation above the collector plate 23 is positioned energy transmitting means 24. In this embodiment means 24 may comprise an insulating glass cover comprising a top glass pane 60 of approximately ⅛ inch thick and a lower glass pane 61 of approximately 3/32 inch thick. The glass panes 60, 61 may be spaced apart approximately ½ inch. The two panes are of identical rectangular configuration slightly smaller than the opening in the top of receptacle 22. The panes are held in spaced relation by a hollow peripheral spacer member 62 of suitable elastomeric material such as vinyl. Within the hollow spacer member 62 may be provided dehydrating crystals 63 for collection of and retention of any moisture or humidity present in the air space between glass panes 60 and 61. Spacers 62 are formed with peripheral recesses 64 which may be filled with a butyl sealant compound so that the air space between the panes 60 and 61 is hermetically sealed. Lack of humidity and hermetic sealing of the air space between the glass panes 60 and 61 not only provides insulation against transmission of heat from the collector panel 23 outwardly through the opening in the rceptacle covered by the radiant energy transmitting means 24, but also permits the transmission of such radiant energy through clear glass panes and a clear air space which is not beclouded by humidity or other unwanted ambient conditions within the air space bacause of the hermetic sealing of the two panes of glass. The dual glass pane cover for the opening in the receptacle thereby affords virtually unobstructed transmission of the sun's rays to the solar collector plate and at the same time provides an insulation cover preventing the escape or transfer of heat from the solar collector plate 23 and the air space thereabove through the dual glass pane cover.

Means for mounting and maintaining the solar collector plate 23 and the energy transmitting means 24 and the receptacle 22 in proper assembled relationship and in hermetically sealed relationship while withstanding stresses caused by expansion and contraction due to changing heat conditions comprises an arrangement of insulation means of material capable of withstanding internal temperature in the order of 350° to 450° F. and pressures resulting therefrom. Generally speaking, such mounting means includes an interior insultion member 70 comprising a pad or block of insulation material supporting substantially all of the solar collector plate 23 except for a peripheral edge margin 71 of plate 23. Insulation member 70 may comprise a relatively soft yieldable permeable fiberglass insulation material.

In the space between the peripheral side walls 31 and the edge surfaces 72 of the relatively soft yeildable insulation member 70 is provided a relatively rigid non-yieldable insulation member 74 having a depth corresponding to the depth of member 70 in unstressed conditionand completely filling the marginal space around the interior insulation member 70. Rigid outer peripheral insulation member 74 provides a flat top surface 75 coplanar with the top surface of insulation member 70 for supporting edge margins 71 of the collector plate 23 with virtually no deformation of the upper interior configuration of the rigid insulation member 74.

On top of peripheral rigid insulation member 74 may be provided a second outer peripheral rigid insulation member 77, said member 77 having a depth less than the space between the top surface 75 of member 74 and the bottom edge of depending lip 33. Rigid insulation member 77 defines the space between the top surface 37 of collector plate 23 and the bottom surface of the glass pane 61 of the energy transmitting means 24. The peripheral insulation member 77 is provided with a bottom surface having a downwardly facing rabbeted recess or edge 78 within which may be received a portion of the edge margin 71 of collector plate 23. Recess 78 extends sidewardly beyond the edge of edge margin 71 to provide space for lateral expansion of plate 23. Rigid insultion member 77 may be made of the same material as member 74 and in this example may include permeable fiberglass insulation material capable of withstanding temperatures in the order of 350° to 450° F.

Rigid peripheral insulation member 77 at its interior upper edge portion 80 is provided with an angle section metal cover strip 81 having a depending leg 82 extending along the interior edge surface of member 77 and a top horizontal leg 83 lying on the top surface of member 77 and providing a seat for te bottom surface of the edge margin of the lower glass pane 61 of the dual pane insulation glass cover. The rigidity of member 77 thus supports the glass cover 24 in desired dimensional relationship with respect to the solar collector panel 23.

The outer rigid insulation members 77 and 74 may be held in assembled relation with the receptacle 22 by a third peripheral insulation member 86 of slightly less rigid characteristic than member 77 and 74 and which is dimensioned to fit laterally within the recess 34 beneath the receptacle edge margins 32 and within depending lip 33. Third insulation member 86 has a depth normally greater than the distance between edge margin 32 and the top surface of insulation member 77, such depth being indicated by the phantom lines 87 in Fig. 3. Since insulation member 86 is somewhat yieldable when the insulation members are assembled, the insulation member 86 will be placed under compression and will frictionally retain and hold second insulation member 77 in position and against any lateral movement thereof which might be caused by expansion and contraction of the solar panel construction. In order to assemble the rigid insulaion member 77 and the somewhat softer insulation member 86, member 86 may be placed in position in recess 34. An angle shaped lifting member may be placed with one leg of the angle beneath the bottom surface of member 86 and an upward force placed upon the angle shaped member so as to compress member 86 within resess 34. The second insulation member 77 may then be laterally slid between the horizontal leg of the lifting member and the top surface of first insulation member 74 so that insulation member 77 may be properly positioned tightly against the peripheral wall 31. The lifting member may be laterally withdrawn from beneath the member 86 and the depending lip 33 thus permitting the insulation member 86 to expand downwardly and into pressure contact against insulation member 77.

Energy transmitting member 24 may then be positioned upon the angle shaped covers 81 on the second insulation member 77 and located in uniform spaced relationship to the depending lips 33 on the receptacle. A suitable vinyl spacer 90 is placed at the bottom of the groove formed between the lip 33 and the edge of the dual pane cover, the spacer 90 being seated upon top surface of rigid member 77. On top of spacer 90 may then be applied compound 91 suitable butyl-type sealant or caulking compound 91 for sealing and retaining the insulated dual pane cover 24 in assembled relation with the receptacle.

The metal angle section cover 81 which may be painted black and which affords a seat for the edge margins of the glass cover, provides a means for transfer of heat between edge margins of the lower glass pane 61 and heated air in space 92 between pane 61 and plate 23 and also insulation member 77. Spacer member 62 between peripheral edge margins of glass panes 60 and 61 may also have its interior, top, and bottom surfaces 62a provided with a black coating or paint. The black coating on spacer member 62 and angle cover 81 serves to absorb heat from the sun's rays and increase the temperature of the edge margins of the glass panes 60 and 61. Since the central portion of the glass panes are heated by the sun's rays and expands, the increased heating of the edge margins of the glass panes by use of the black coating, substantially reduces any temperature gradient between the center and edges of the panes 60 and 61. Thus abnormal edge stresses, usually produced by differential temperatures between the center and edges of the glass panes are substantially relieved and minimized.

Possible breakage by heat induced stresses of the dual glass cover under conditions of operation is reduced.

Insulation members 70, 74, 77 and 86 are permeable. The panel construction is hermetically sealed for the purpose of avoiding clouding of the air space within the receptacle construction. Prior to placement of the isulation members 70, 74, 77 and 86, it is desirable that a suitable desiccant 88 be applied to the isulation material so that the interior of the receptable when assembled will be effectively dehumidified. Thus, the chance of moisture being affected by the changing heat conditions within the receptacle and causing fogging or clouding of the air space 92 between the glass cover and the solar panel is eliminated or minimized to an insignificant measure.

Assembly of the solar panel construction described above is readily apparent from the above description. The formed receptacle 22 may be first provided with the lowermost first peripheral insulation member 74. The solar collector plate 23 may be assembled with the soft insulation member 70 and, handled as a unit, inserted into the receptacle with the inlet and outlet tube portions extending through the openings in the bottom wall and the margins of the collector plate 23 seated upon the rigid insulation member 74. The third insulation member 86 may then be inserted into the recesses 34, held in compressed position while the second intermediate rigid insulation member 77 is slid between the member 86 and the member 74. The assembly tool is withdrawn and the assembled dual pane glass cover seated upon the second insulation member 77 and sealed as described above. The gasket seals 48 for the inlet and outlet tubular portions may be then installed.

During this assembly, a small vent hole 93 is provided in wall 31 of the receptacle. Vent hole 93 has communication with air space 92 through the permeable insulation material 70, 74, 77 and 86. To precondition the solar panel construction so that expansion and contraction of the various parts of the solar panel construction will be compensated for in part, the panel construction is subjected to radiant energy until the temperature therein reaches a selected temperature, for example 200°F. Under such temperature conditions, the air within the receptacle construction has expanded and such pressure expansion has been relieved through the vent hole 93. While at such temperature condition, vent hole 93 is sealed by suitable means such as plugging and brazing. Thus upon cooling to ambient temperature, the air pressure will be reduced and the several parts of the solar panel construction will contract to a selected prestressed normal ambient condition.

Figure 10:
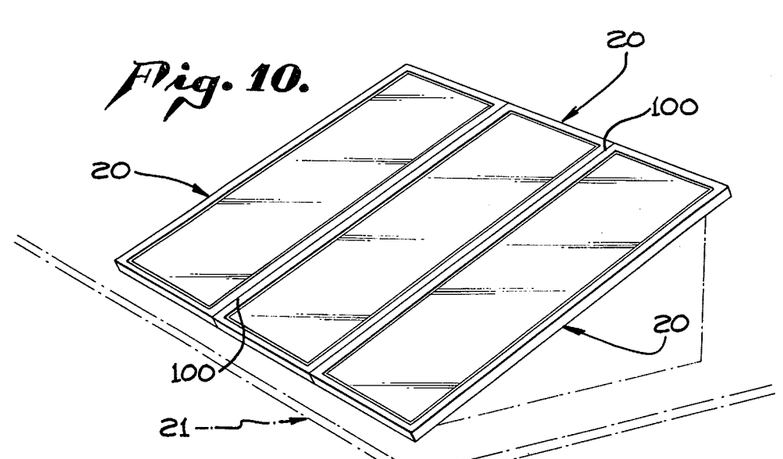
FIG. 10 is a fragmentary perspective view illustrating one arrangement of panels embodying this invention.
Figures 11, 12, 13:
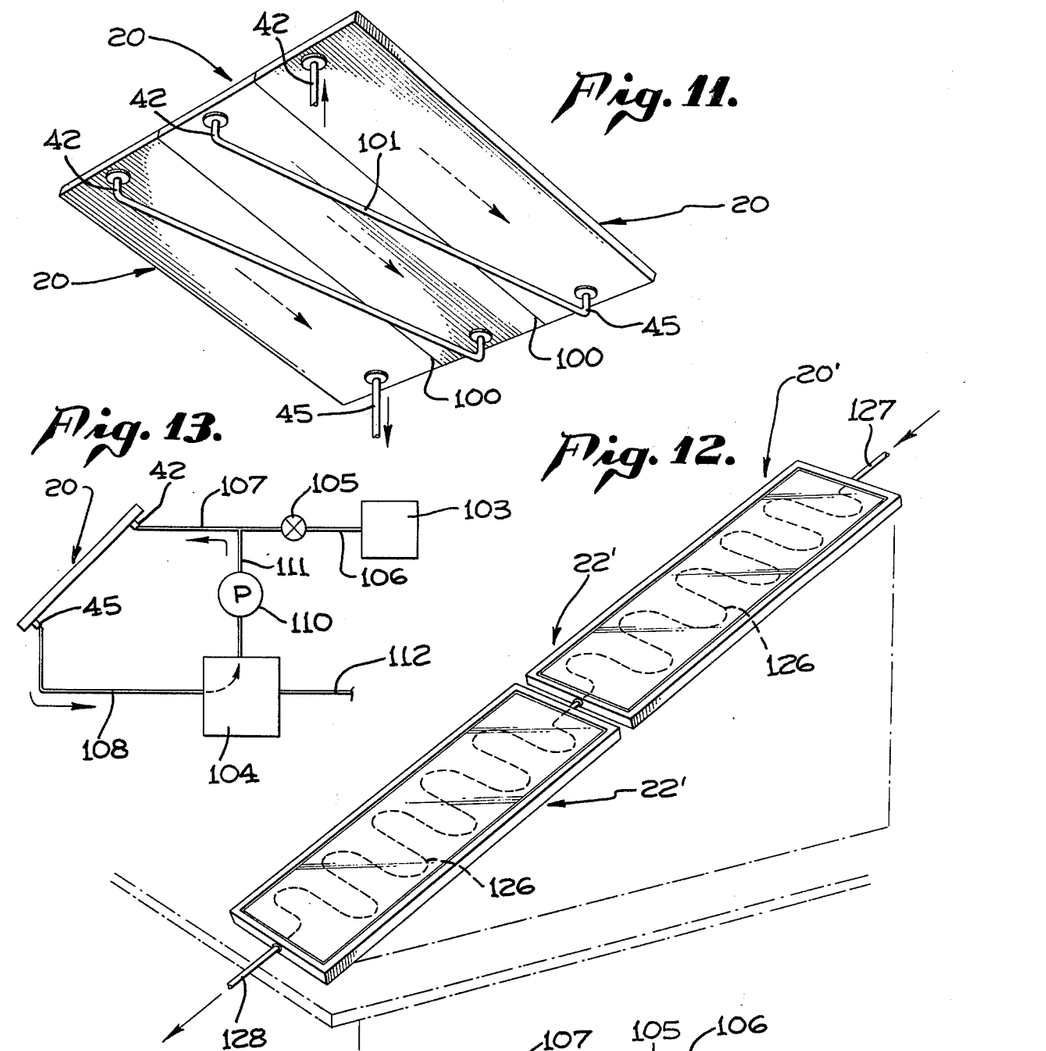
FIG. 11 is a fragmentary back perspective view of Fig. 10.
FIG. 12 is a fragmentary perspective view illustrating another arrangement of solar panels embodying this invention and utilizing the arrangement of circulating tubes shown in Fig. 9.
FIG. 13 is a schematic line diagram illustrating a solar panel system for storing solar energy in water.

FIGS. 10 and 11 show a plurality of solar panel constructions 20 arranged in an inclined horizontal bank upon a suitable deck 21. Each of the panels 20 are closely abutted together as at 100 in side edge relation. As shown in FIG. 11, the outlet tube portion 45 of one panel may be connected by a diagonally extending connecting tube 101 to an outlet tube portion 42 of an adjacent panel construction. THe outlet portion 42 on one of the end panels serves as an inlet from a fluid supply source 103, FIG. 13, and at the other end of the row of panels the outlet tube portion 45 may be connected to a suitable storage tank 104. It will be understood that other suitable arrangements for interconnecting the tubular portions of the solar panel constructions may be employed depending upon the installation and operation conditions.

FIG. 13 illustrates a flow diagram for a system utilizing the solar panel construction of this invention. Water from a fluid supply source 103 is controlled by a valve 105 in water line 106 which is connected to an inlet line 107 coupled to the inlet tubing portion 42 of solar panel construction 20. Inlet tube portion 45 is connected by line 108 to a storage tank 104. A pump 110 in line 111 connects the storage tank with the line 107 so that water may be circulated from the storage tank 104 to the solar panel construction 20 at a selected flow rate, for example, 14 gallons per minute. Thus continuous circulation of water through the panel construction 20 serves to heat a selected quantity of water provided for by the storage tank 104. A distribution line 112 is connected to storage tank 104 so that water at a selected temperature may be drawn from the storage tank for use either as hot water for normal washing purposes or may be used for other heating purposes.

Figure 14:
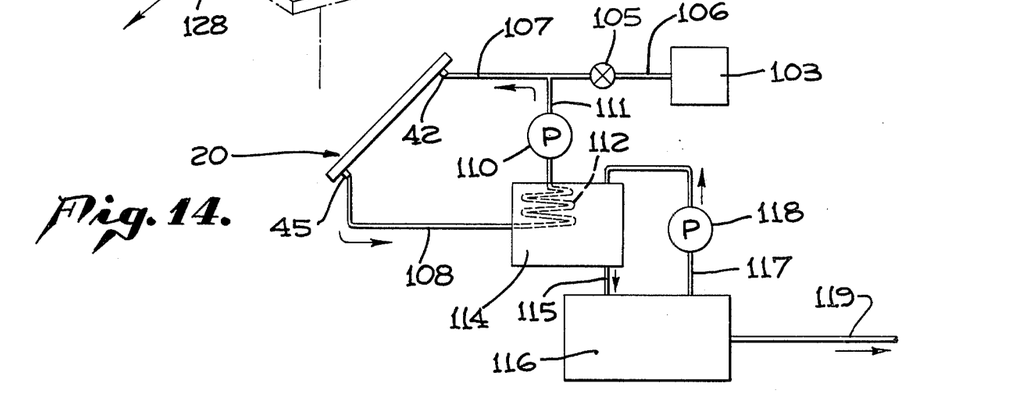
FIG. 14 is a schematic line diagram illustrating another system for storing solar energy in water.

FIG. 14 illustrates a slightly different flow diagram in which the water supply source 103, solar panel construction 20, pump 110 and interconnecting lines 106, 107, 108 and 111 are in a closed circuit provided by a coil 112 in a supply tank 114 of a fluid such as water which is not circulated through the solar panel construction but to which heat is transferred by the coil 112. Such an installation may be desired when the supply source of water at 103 to be heated by the solar panel construction is not portable or is of a character which might damage the tubing in the solar panel construction.

The fluid in storage tank 114 to which the solar energy is transmitted by coil 112 may be connected by an outlet pipe 115 to a storage tank 116 having a circulation line 117 provided with a pump 118 for circulation water through the heat transfer tank 114. A distribution outlet line 119 is provided for drawing the heated water from the tank 116.

Figure 6:
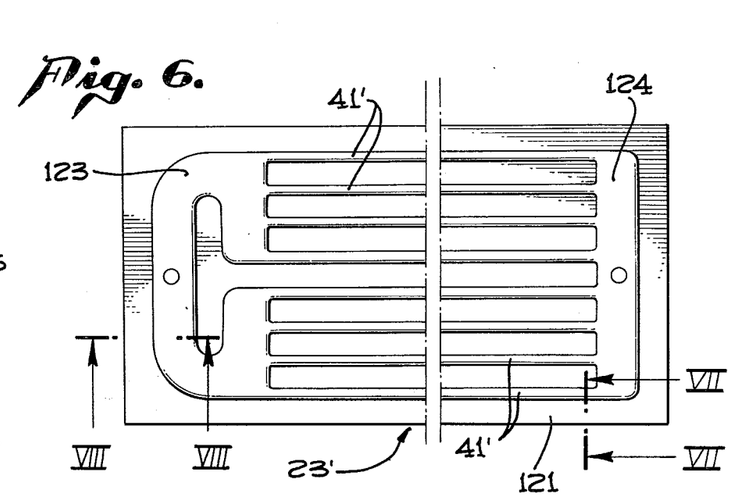
FIG. 6 is a different modification of a solar collector panel used in this invention.
Figures 7, 8:
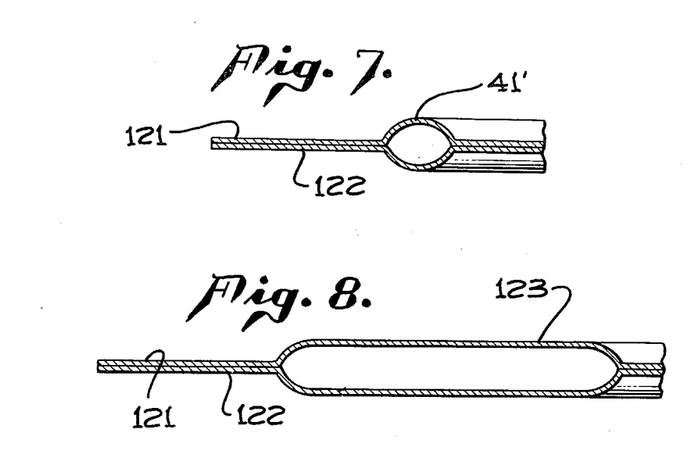
FIG. 7 is a fragmentary sectional view taken in the plane indicated by line VII—VII of Fig. 6.
FIG. 8 is a fragmentary sectional view taken in the plane indicated by line VIII—VIII of Fig. 6.

Before describing in detail the operation of solar panel construction 20, it should be noted that in FIG. 6, a modification of the solar collector plate 23 is indicated at 23'. In this modification, solar collector plate 23' is formed from two thin metal sheets 121 and 122 of rectangular form. One of the sheets may have imprinted thereon a silk screen pattern which corresponds to the arrangement of parallel tube sections 41', header sections 123 and 124. The two thin sheets of material 121 and 122 are then molecularly bonded together under conditions of relatively high pressures and temperatures in order to accomplish such molecular adhesion. The adhesion occurs at areas of the metal sheets in contact and not at the pattern provided by the silk screening process. After the two sheets are so molecularly bonded, the tubular sections 41 and header sections 123 and 124 are formed by introducing pressure air into one end of the printed flow pattern so that the non-bonded portions of the sheet material are separated to provide a flow area of selected size as indicated in FIGS. 7 and 8. The header portions 123 and 124 are provided with suitable inlet and outlet fittings for connection to the fluid circuit diagram such as indicated in FIGS. 13 and 14. It will be understood that the upper surface of a solar collector panel such as 23' may likewise be coated with a black coating which has minimum outgassing, minimum reflectivity, and maximum absorbtivity. The mounting of a collector plate 23' may be similar to that described for the collector plate 23.

Figure 9:
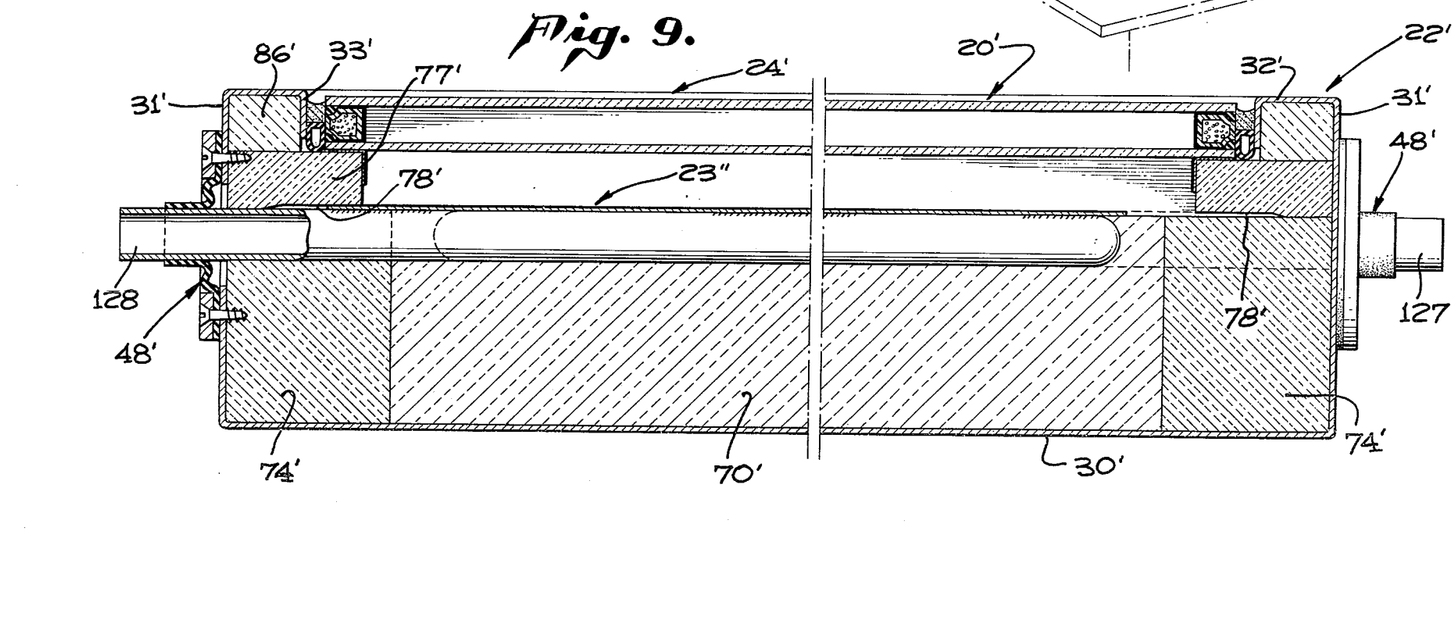
FIG. 9 is an enlarged sectional view taken in a vertical plane similar to the plane of Fig. 2 showing a modification of the water circulating tubes of the absorber panel.

FIG. 9 and FIG. 12 illustrate solar panel constructions 20' in which the solar panel construction is similar to that described for the previous embodiment but in which the solar collector plate is provided with tubing inlet and outlet portions that extend through the peripheral side walls 31' instead of the bottom wall of the receptacle 22'. In the embodiments shown in FIGS. 9 and 12, the arrangement of tubing 126 is looped transversely of the receptacle 22' and end tubing inlet portions 127 and outlet portions 128 are provided in the end sections of the peripheral wall 31 and mounted and sealed by flexible, yieldable, suitable gasket means 48'.

The end to end inlet and outlet arrangement of this modification of the invention requires that the solar collector plate 23" be assembled in slightly different fashion than the assembly of the previous embodiment. In this embodiment the relatively soft interior insulation member 70' is provided with a recess in its top surface corresponding to the looped arrangement of the tubular sections 126 so that the solar collector plate 23" with its depending tube sections 126 may be received therein in final assembly. The plate 23" may be inserted into the receptacle which then contains only the first insulation member 74' and the soft member 70' so that one of the endwise tube portions 128 or 127 is inserted fully into and through the opening in the wall 31' so that the opposite tube portion may clear the edge margin 32' and lip 33'. The tube portion may then be directed through its associated wall opening and the entire plate moved endwise until the margins of the collector plate 23" are seated upon the rigid insulation member 74' for support thereof. The second and third insulation members 77' and 86' and the glass cover 24' may be assembled as described in the prior embodiment. suitable coupling means may be provided between endwise associated panel constructions as shown in FIG. 12.

In operation of the solar panel constructions described above, it will be readily understood that the panels are inclined to the horizontal and are facing the sun at the most optimum angle for the particular location of the solar panel construction. Various means which are not part of this invention may be employed to cause the panel constructions to turn and face the sun at a selected time in the morning, to turn with the sun as the sun progresses to its zenith and beyond until the sun reaches a selected angle where the solar panel will no longer turn with the descending sun. Radiant energy rays emanating from the sun are transmitted through the energy transmitting or glass cover 24 through the air space in the glass cover and through the air space below the glass cover to impinge upon the black coating which covers the solar collector or absorber plate 23. The plate 23 is heated by the solar radiant energy and such heat is conducted by the metal of the solar plate and the metal connections of the tubing thereto to water circulated in the tubing. Such water is circulated at a selected rate as above described and heat from the metal is transferred to the water where it is stored for later use. the temperature of the solar plate material may reach as high as 450°to 500°F. Under such high temperature conditions, the metal of the plate must expand and longitudinal and lateral expansion is permitted by the peripheral recesses 78 provided between the isulation members 74 and 77. The air in the space 92 between the glass cover 24 and the collector plate 23 is also heated and upon heating increases the air pressure within the hermetically sealed receptacle 22. Such expansion of heated air within the space 92 imparts pressure forces against the glass cover 24 and the plate 23. Glass cover 24 is permitted to lift because of the flexible yieldable mounting of the edges of the glass cover provided by the butyl sealant 91. Since the cover 24 is of dual pane construction, loss of heat therethrough is minimized because the air space between the glass pane 60 and 61 restricts transfer of heat. The hot pressure air in space 92 also imparts a pressure force against the relatively thin section solar collector plate 23. Since the insulation material of member 70 is soft and yieldable, deflection of plate 23 because of such pressure air is permitted throughout virtually its entire area except at the edge margins which are relatively rigidly supported by the rigid insulation members 74. Such deflection of plate 23 is partially absorbed by the soft yieldable insulation member 70 and some of the deflection may be transmitted to the sheet metal bottom wall 30 which is also capable of deflection. Under some conditions, it has been found that the cover 24 may be lifted or raised as much as one-fourth of an inch and the bottom wall 30 deflected as much as 3/32 of an inch.

It is important to note that the capability of the solar panel construction to compensate for and accommodate itself to such temperature and pressure conditions is facilitated by the use of insulation members 70, 74, 77 and 86 which are permeable to air. Thus, throughout the receptacle 22 there is fluid communication entirely around the collector plate 23 both above, below and to the sides thereof. since the panel construction is hermetically sealed for the purpose of preventing introduction of foreign fluids or gases which might detract from the efficient operation of the solar panel construction, the permeability of the internal materials surrounding the collector plate affords a compensating and relief means for the stresses and forces which are created by the absorption of the solar radiant energy in plate 23. In effect, the receptacle 22 is capable of deflecting and deforming in three dimensions and to expand and contract without loss of air tightness and efficient operation.

It should be noted that while the solar panel construction described above is capable of "breathing" that is, yielding and compensating for stresses imparted thereto by the collection of solar radiant energy, that the rigid tubing sections may move relative to the receptacle and that such movement does not cause loss of the weather tight sealed condition because of the flexibility and yieldability of the gasket mounting of the inlet and outlet tubing portions in either the bottom or peripheral wall of the receptacle. It should be noted that the breathing effect provided by this solar panel construction is the result of the absence of fixed fasteners or screws in the assembly of the receptacle, rigid and soft insulation material, support and retention of the collector plate between rigid insulation material, and yieldable positioning and retention of the dual pane glass cover by the butyl sealant.

Preferably, the energy transmitting means comprising the sealed spaced glass panes 60 and 61 may be made with the outer glass pane 60 of tempered glass so that the top exposed surface of the solar panel construction is capable of withstanding severe weather, hail storms, wind storms, and the impact of stones or other debris. In the event the solar panel contruction is used as part of a deck or roof structure, it is desirable that the outer glass pane 60 be strong enough to permit walking thereon.

The term solar collector or absorber plate as used herein means a member capable of absorbing radiant energy and transferring said energy to another form of energy. The material of the solar collector plate may reach temperatures as high as 450° to 500°F. Preferably, the energy represented by such high temperatures is transmitted and transferred to fluid circulating in the tubes of the solar collector plate. The transfer of such energy is by conduction and efficiently and effectively heats the fluid passing through the tubes of the collector plate. Since the transfer of heat is by conduction, it is preferable that the tubes be in continuous metal to metal contact with the plate.

It will be understood that various types of materials may be used in the solar panel construction and that in view of the severe temperature and pressure operating conditions to which the panel is subjected, that such materials must be selected which will provide the most optimum operation of the panel. Moreover, the energy crisis has demanded that solar energy be collected with devices which are capable of operation and capable of manufacture at cost which are reasonable and preferably as inexpensive as possible. The materials used in the solar panel construction described above and the manner in which they are cosntructed and arranged, provides an efficient effective collector of solar energy by a device which is inexpensive and readily manufactured.

It will be understood that various modifications and changes may be made in the solar panel construction described above and all of such changes and modifications coming within the scope of the appended claims are embraced hereby.

I claim:

1. A solar panel construction comprising:
   a receptacle having a bottom wall, an upstanding peripheral wall, and a top opening defined by said peripheral wall,
   a solar collector plate supported below said top opening;
   said plate having tubular means in heat transmitting relation thereto for circulation of a fluid;
   said tubular means having inlet and outlet means;
   an energy transmitting means spaced above said collector plate in said top opening;
   and means for yieldably mounting and maintaining said plate and energy transmitting means in sealed assembly with respect to said receptacle whereby differential expansion and contraction are compensated without impairing said sealed relation,
   said mounting means including air permeable means.

2. A solar panel construction comprising:
   a receptacle having a bottom wall, an upstanding peripheral wall, and a top opening defined by said peripheral wall,
   a solar collector plate supported below said top opening;
   said plate having tubular means attached thereto in heat transmitting realtion for circulation of a fluid;
   said tubular means having inlet and outlet means; having inlet and outlet means;
   an energy transmitting means spaced above said collector plate in said top opening;
   and means for yieldably mounting and maintaining said plate and energy transmitting means in sealed assembly with respect to said receptacle whereby differential expansion and contraction are compensated without impairing said sealed relation;
   said mounting means including first dimensionally stable permeable insulation means at peripheral portions of said receptacle for supporting edge margins of said plate;
   said permeable insulation conducting air heated by said collector plate throughout the receptacle and minimizing air pressure differentials in the receptacle.

3. In a panel contruction as stated in claim 2 wherein said mounting means includes a soft permeable insulation means beneath said collector plate for floatingly supporting interior areas of said collector plate.

4. In a panel contruction as stated in claim 2 wherein said mounting means includes
   a second dimensionally stable permeable insulation peripherally a arranged above said first insulation means and extending inwardly for defining air sapce between said collector plate and energy transmitting means and supporting edge margins of said energy transmitting means.

5. In a panel construction as stated in claim 4 wherein said mounting means includes
   insulating members on said second rigid insulation means and having a depth dimension greater than the space into which it is received whereby peripheral margins of each of said rigid insulation means are held under predetermined compression.

6. In a panel construction as stated in claim 1 wherein said mounting means includes
   said air permeable means including insulation means;

each inlet and outlet means extending through said insulation means to the exterior of said receptacle, and flexible gasket means affording axial and lateral movement of said inlet and outlet means under conditions of expansion and contraction during operation of said solar panel.

7. In a panel construction as stated in claim 4 including means for reducing heat differential between the central part and the edge margins of the energy transmitting means.

8. In a panel construction as stated in claim 7 wherein:

said reducing means includes providing edge margins of said second insulation means with an energy absorbing coating.

9. In a panel construction as stated in claim 7 wherein:

said reducing means includes providing edge portions of said energy transmitting means with an energy absorbing material.

10. A solar panel construction, comprising:

a hollow receptacle having an opening;

a transparent cover means for said opening;

an energy collecting means within said receptacle and facing said opening to receive radiant energy passing through said opening;

means within said receptacle supporting said energy collecting means and said cover means and regulating thermal movement of said cover means and energy collecting means to maintain said panel construction in sealed assembly;

said means including permeable means extending beneath said collecting means and around the peripheral edges of the collecting means providing communication of air around said energy collecting means.

11. A solar panel construction as stated in claim 10 wherein supporting and regulating means includes means providing a peripheral space between said hollow receptacle and said cover means within the planar zone of said cover means;

and a flexible yieldable material in said peripheral space in sealing contact with said receptacle and cover means.

12. A solar panel construction as stated in claim 11 wherein said permeable means supporting said cover means extends opposite said peripheral space in said planar zone and opposite said flexible yieldable material in said space.

13. A solar panel construction as stated in claim 10 wherein said permeable means extends beneath substantially the area of said collecting means and is yieldable to deflection of said collecting means.

14. A solar panel construction as stated in claim 10 wherein said energy collecting means includes inlet and outlet means extending through said permeable means and said receptacle;

and means resiliently and yieldably connecting said inlet and outlet means to said receptacle.

* * * * *